United States Patent Office 3,165,567
Patented Jan. 12, 1965

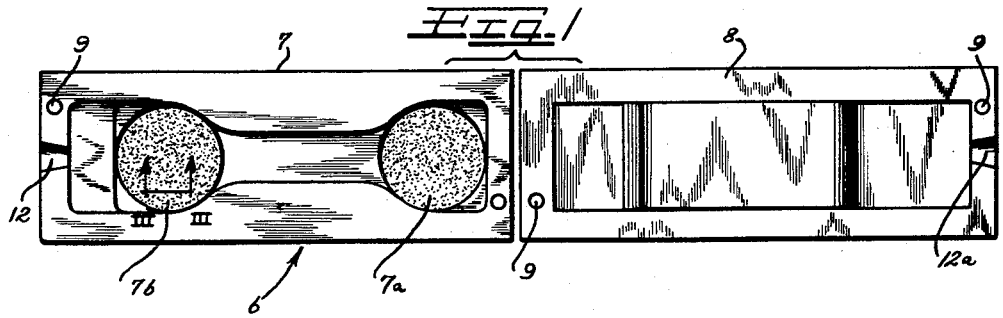
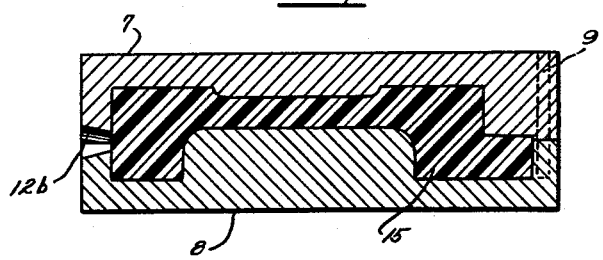
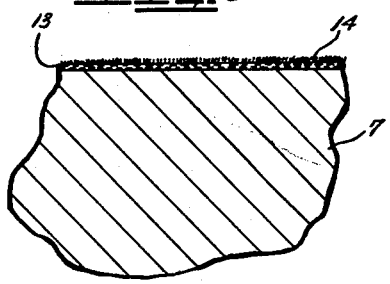
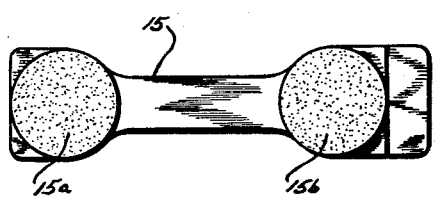
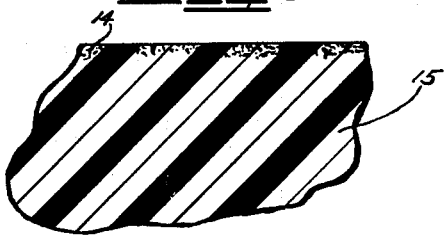
Inventor
RICHARD L. OLSON

3,165,567
METHOD OF INTEGRALLY SURFACE LUBRI-
CATING MOLDED PLASTIC ARTICLES
Richard L. Olson, Chicago, Ill., assignor to Dike-O-Seal
Incorporated, Chicago, Ill., a corporation of Illinois
Filed July 1, 1960, Ser. No. 40,265
3 Claims. (Cl. 264—255)

This invention relates to a method for surface impregnation of plastic and elastomeric materials with dry lubricants and the products thereof for reducing the coefficient of friction of the surfaces of such materials.

It is well known in the art that most plastic and elastomeric materials have relatively high coefficients of friction, thus generally rendering them unfit for use in applications requiring frictional engagement of the plastic or elastomeric material with similar or dissimilar materials.

Coating of plastic or elastomeric materials with particles of other materials having coefficients of friction suitable for lubricating purposes has not been employed commercially with any degree of success because of the lack of suitable adhesive properties for the carrier of the particles of low coefficient of friction with plastic or elastomeric materials. In practice, it has been observed that where such particles have been coated or sprayed on a plastic or elastomeric material, frictional engagement of the thus coated article would soon cause dislodgement of the particles from the coating and result in a reduction of the efficiency of the lubricating surface in a very short time.

Attempts I have heretofore made to completely impregnate the plastic throughout with such particles of low coefficient of friction required mixing of the lubricating particles throughout the plastic material while it was in the plastic or liquid state in order to obtain some degree of surface lubrication by those particles which jutted from the surface of the plastic article. This method proved quite expensive, considering the present day cost of the available lubricating materials and the quantities thereof required to ensure that a proportionate number of the particles is provided at the surface of the plastic or elastomeric article.

Unexpectedly, I have found that only the surface of plastic or elastomeric materials may be impregnated with lubricating materials, thereby reducing the coefficient of surface friction of the plastic or elastomeric materials to a level sufficient to permit their use in friction applications with similar or dissimilar materials.

For impregnating the surface of castable or moldable plastic or elastomeric materials, it is preferable to impregnate during the molding or casting operation. The molding surface of the molding or casting apparatus is first treated with a parting agent and then finely powdered material or mixtures of materials having lubricating properties are dispersed on the superficial surface of the parting agent. After the lubricating material is applied to the parting agent, the liquid plastic or elastomeric material from which the article is to be formed is poured into the mold and permitted to set therein. Upon curing, the molded plastic or elastomeric article is found to have impregnated in the surfaces thereof substantially all of the finely powdered material or mixture of materials having lubricating properties.

Thus I provide lubricating surfaces for materials heretofore having high coefficients of friction. Furthermore, the thickness of the lubricating surface may be controlled by the quantity of particles of lubricating material applied to the surface. Additionally, the surface or surfaces of the plastic or elastomeric material may have impregnated therein lubricating materials having either electrical or dielectric properties for particular applications. The resulting article or surface of elastomeric or plastic material impregnated with the lubricating material has a coefficient of friction at a level sufficient to permit the use of such materials in frictional engagement with similar or dissimilar materials.

It is an object of the present invention to provide means for impregnating the surface or surfaces of plastic and elastomeric materials with materials or mixtures of materials having lubricating and protective properties.

It is still another object of the present invention to provide improved methods of impregnating the surfaces of plastic or elastomeric materials with finely powdered materials or mixtures of materials having lubricating properties.

It is a further object of the present invention to provide a method of impregnating the surface or surfaces of plastic and elastomeric materials with finely powdered particles of materials or mixtures of materials having lubricating properties as a step in a molding or casting operation.

It is another object of the present invention to provide a method of impregnating the surface of polyurethane resins with a lubricating material or mixture of lubricating materials for reducing the coefficient of friction of the polyurethane resin.

It is still another object of the present invention to provide plastic or elastomeric material surfaces impregnated with dry lubricating materials.

Yet another object of the present invention is to provide polyurethane resin surfaces impregnated with dry lubricating materials.

These and other objects, features and advantages of the present invention will become more apparent upon a careful consideration of the following detailed description, when considered in conjunction with the accompanying drawing, illustrating preferred embodiments of the present invention and wherein like reference numerals and characters refer to like or corresponding parts throughout the several views.

On the drawing:

FIGURE 1 is a view in elevation of molding or casting apparatus found useful in the practice of the present invention.

FIGURE 2 is a longitudinal section taken along lines II—II of FIGURE 1.

FIGURE 3 is an enlarged fragmentary view in section illustrating the relationship of the impregnating material and the plastic or elastomeric material being formed in the mold of FIGURE 1.

FIGURE 4 is a view in top elevation of a journal stop molded in the apparatus of FIGURE 1.

FIGURE 5 is a side elevational view of the journal stop of FIGURE 4.

FIGURE 6 is an exaggerated and enlarged fragmentary view of the journal stop of FIGURE 5 illustrating the interstitial bonding feature of the present invention.

Briefly stated, the present invention relates generally to improved methods for impregnating the surface or surfaces of plastic and elastomeric materials with a material or mixture of materials having lubricating properties for the purpose of reducing the coefficient of friction of the plastic or elastomeric material.

Plastic and elastomeric materials found useful in the practice of the present invention include any moldable or castable plastic resins or mixtures of resins. Depending upon the application involved, either thermosetting or thermoplastic resins may be employed. For example, the phenolformaldehyde and phenol-furfural compounds, the urea-formaldehyde compounds, the vinyl resins, nylon plastics, cellulose derivative plastics, epoxy resins, urethane resins, such as polyurethane and other suitable plastic materials and mixtures thereof. The elastomeric materials found useful in the present invention include, for example, the natural latexes and the synthetic latexes such as neoprene, the buna rubbers, and the butyl rubbers.

The plastic material or elastic material itself may include additives such as plasticizers, molding accelerators, and coloring agents, as desired.

Among the lubricating materials found useful in the practice of the present invention are included graphite, molybdenum disulphide, tungsten, platinum, lead, zinc, and the lately developed beads or spheres of silicon and other materials having low coefficients of friction.

Preferably the lubricating material is in finely powdered form to ensure uniform application of the material to the surface of the material, and excellent results have been obtained with the lubricating material particles predominantly of multi-micron size and having a mesh screen size of from minus 50 to plus 50 microns, while I prefer to employ lubricating materials of a mesh size of from about minus 40 microns to about plus 40 microns. It will be appreciated, of course, that depending upon the particular application involved, the lubricating material may be of a particle size larger or smaller than the ranges hereinabove set forth.

The lubricating material particles may be applied to the parting agent in the molding application by spraying in a carrier such as alcohol.

The amount of lubricating material employed for a particular application will depend, in part, upon the thickness of the lubricating surface required.

The articles molded from the plastic or elastomeric material impregnated in accordance with the present invention with lubricating materials exhibit coefficients of friction of an order of magnitude sufficient to permit their use in applications requiring frictional engagement of the plastic or elastomeric material with similar or dissimilar materials, such as in any reciprocating or rotating application wherein sliding surface engagement is present. For example, the lubricant impregnated materials of the present invention may be shaped as journal stops, gears, slides, bearings, and the like. In addition, the lubricant impregnated plastic or elastomeric materials of the present invention may be used as a surface coating for pattern and core box equipment for foundries, and as surface coatings for conveyors, hoppers, flasks, guideways, and chutes which are subjected to abrasion by sand and other abrasive materials in sliding or friction contact therewith.

In the practice of the present invention wherein molded or cast plastic or elastomeric materials are to be surface impregnated with a material having dry lubricating properties, the mold is first coated with a mold parting agent, preferably a silicone base grease or wax. It is advisable to preheat the mold, preferably to a temperature within a range from about 180° F. to about 212° F. before applying the finely powdered particles of lubricating material to the silicone parting agent where the powdered lubricating material is applied to the silicone parting agent in a liquid vehicle. Alcohol has been found to be a suitable vehicle for the lubricating material since alcohol does not dissolve the silicone coating from the mold. By preheating the mold, it will be appreciated that the vehicle or carrier for the lubricating material will rapidly evaporate without washing, running or dripping from the silicone and ensure a more even or uniform distribution of the lubricating material particles on the surface of the plastic or elastomeric material to be molded. It is also advisable to remove the excess parting agent from the mold surface before applying the powdered lubricant material to the mold surface. This parting agent removal may be carried on by wiping off the surplus parting agent with a clean cloth, and the minute amount thereof left on the mold surface still is sufficient to function as a release or parting agent.

In the embodiment shown in FIGURE 1 of apparatus found useful in the practice of the present invention, there appears a split mold for a journal stop, generally indicated by the numeral 6, comprising an upper portion 7 and a lower portion 8 suitably assembled as by pin means 9. The mold portions 7 and 8 are provided with complementary apertures 12 and 12a defining a pouring gate 12b communicating with the mold cavity.

For purposes of illustration the mold dies define therebetween a die cavity for a journal stop for journal bearing boxes of railroad cars. The lubricating material may be applied only to the stop surfaces 7a and 7b of the mold cavity.

As a specific example of a plastic material surface impregnated with a lubricant material in the apparatus of FIGURE 1, a plastic material having the following composition was prepared.

"Adiprene" L-100, a liquid urethane polymer which may be cured to a strong, rubbery solid having a specific gravity of 1.06 and a viscosity at 212° F. of 500-600 cps., sold under the above trademark by the Du Pont Company, was mixed with a curing agent, "Moca," sold by the Du Pont Company. The curing agent varies the properties of the matrix. For example, as the curing agent content is increased or decreased, tensile strength and hardness properties may correspondingly increase or decrease. Additional additives such as plasticizers, accelerators, lubricants and coloring agents may be incorporated in the plastic or elastomeric material mix, as desired or required.

The mold 6 is degreased, heated to a temperature from about 180° F. to about 212° F., and the silicone release or parting agent applied thereto. Preferably, the excess silicone is removed from the mold surfaces. Finely divided particles of tungsten (minus 40 microns mesh size) were incorporated in a Freon gas spray container and the Freon gas, being compatible with the raw or uncured urethane matrix, provided means for uniformly depositing the lubricant on the superficial surface of the silicone parting agent. The lubricating material particles are applied to the superficial surface of the parting agent in a carrier such as a suitable alcohol. Preheating of the mold assists in removing the liquid carrier of the tungsten lubricating particles from the mold.

As appears in FIGURE 3, the urethane mix was poured through the gate 12 into the mold cavity after the superficial surface of the silicone parting agent 13 was provided with the coating of the tungsten particles 14 which separates the release agent from the plastic material 15. The polyurethane matrix was permitted to set in a conventional curing oven at approximately 212° F. for a period of approximately 25 minutes. After the mold was removed from the curing oven, the molded part was easily removed from the mold, indicating that the curing process had no effect on the parting properties of the silicone. The tungsten coating which had been sprayed on the superficial surface of the silicone parting agent had been uniformly transferred from the surface of the parting agent to the surface of the polyurethane molded journal stop 15 and had become imbedded therein.

Visually, the lubricating particles appear to have left the superficial surface of the parting agent and had become uniformly dispersed in the surface of the plastic material, presenting to the eye a homogeneous surface layer of the lubricating material. The mold surfaces appeared clean and free of the lubricating material.

Apparently, the lubricating particles and carrier therefor develop a porous matrix of the lubricating particles on the superficial surface of the parting agent, when the carrier evaporates, and the liquid plastic or elastomeric material, when poured into the mold cavity, penetrates the lubricating particle matrix to the parting agent surface so that, in setting, the plastic or elastomeric material sets as a carrier matrix around the lubricating particles.

The term "matrix" is used in the sense of, "An aggregate of ground mass in which a discrete object is embedded." (The Van Nostrand Chemist's Dictionary.)

In the powdered form of material used, when applied to a mold surface as a powder it is easily displaced, whether or not there is a parting agent on the mold surface, because the particles of the dry material remain free from attachment to contiguous particles. On the other hand, in the matrix developed according to the principles of this invention, evaporation of the liquid carrier apparently effects a cohesive bonding of the particles to one another according to well known physical laws, namely, at the contact points of the dry particles. This phenomenon is commonly noted in the settling of dust by sprinkling or by rain, where after the water has evaporated the dust is found to have formed a crust or to have joined the base soil as a superficial layer and resists blowing displacement until mechanically disturbed. Since the particles after deposit on the mold surface are held to each other without any interstitial binding substance, but only by means of the molecular action of the evaporated carrier, there are interconnected voids providing the porous matrix to receive the liquid moldable material substantially without movement of the matrix particles. Upon solidifying, the molded material forms a matrix in which the particles are firmly held.

Care should, therefore, be taken that the carrier used for the lubricating material is inert chemically and physically, with respect to the parting agent used. Otherwise, it appears that the complete penetration of the lubricating material into the parting agent would prevent the plastic or elastomeric material from penetrating the lubricating material matrix. In other words, there would be mixture of the parting agent and lubricating material particles which would not be effectively penetrated by the plastic material. Thus, the parting agent should be one which will permit the application of the lubricating particles to only the superficial surface thereof to permit penetration of the plastic or elastomeric material into the lubricating material matrix to the parting agent surface, and, when a carrier is employed for the lubricating agent, the carrier should be inert with respect to the parting agent for the same reason.

Care should also be taken that the pressure of the molding material flowing into the mold is insufficient to displace the particles of lubricating material from the desired location in the mold. This is particularly true when employing injection molding type techniques. Preferably, in such methods a diffuser or flow rate reducer should be employed to control the rate of flow of the elastomeric or plastic material into the mold to prevent displacement or localization of the lubricating material.

The surfaces 15a and 15b of the journal stop 15 impregnated with the lubricating material exhibited a firm bond as appears in FIGURE 6. Surface impregnation of molded polyurethane parts with graphite and molybdenum disulphite lubricating materials occurred in the same manner as above described and firm bonding between the plastic matrix and the lubricating material resulted.

The journal stops, prepared in accordance with the above practice, were then tested in friction tests with similar plastic and elastomeric materials thus impregnated, with similar plastic and elastomeric materials not impregnated in accordance with this invention, and with dissimilar materials. It was found that a marked decrease in the coefficient of friction of the surfaces being tested resulted because of the impregnation in accordance with the present invention which thereby permits use of the thus impregnated plastic or elastomeric material in friction applications heretofore considered unfeasible.

This invention finds particular applicability with polyurethane resins which are known to have high coefficients of friction. If polyurethane articles or surfaces are merely coated, for example, by brushing or spraying, with finely powdered tungsten, graphite or molybdenum disulphide it has been my experience that the thus coated polyurethane resin material or surface 15a does not exhibit a strong bond with the lubricating material. Substantially all of the lubricant may be wiped from the coated surface with water, or kerosene or other solvent. Additionally, a spray of water will wash off the coating. By employing the present invention, the lubricating material is firmly imbedded in the surface of the polyurethane material and cannot be washed or rubbed off the surface as may the lubricating material merely coated on the surface.

Impregnation of the surface of plastic or elastomeric materials having high coefficient of friction with dry lubricants reduces the coefficient of friction of these materials to a level sufficient to permit their utilization in applications requiring frictional engagement between the plastic or elastomeric material and other similar or dissimilar materials. I also provide simple methods of impregnating the surface of plastic and elastomeric materials with dry lubricants.

Although minor modifications might be suggested by those skilled in the art, it should be understood that I with to embody within the scope of the patent warranted hereon, all such embodiments as reasonably and properly come within the scope of my contribution to the art.

I claim as my invention:

1. In a method of preparing a mold for making articles from a liquid plastic material which in its cured solid state has a high coefficient of surface friction, heating to not over 212° F. a mold having a molding surface, applying to said surface a parting agent in generally fluid condition but unaffected by said temperature of the mold, wiping excess parting agent from said surface to leave a uniform layer of parting agent only sufficient for its releasing or parting function and to avoid running of the parting agent after such wiping, while the mold is still at about said temperature spraying a substantially uniform coating of finely divided particles of solid lubricating material predominantly in a multi-micron size to pass through a 50 micron mesh screen in a volatile vehicle onto the superficial surface of the parting agent, and by the residual heat of the mold rapidly evaporating the carrier and effecting superficial adherence of the particles of lubricating material to said layer of parting agent and to one another with interstitial spaces through the coating and thereby forming a porous matrix of the lubricating material particles wherein the particles mutually sustain one another against displacement when the liquid plastic material is run thereonto and thereover in loading the mold but permit running of the liquid plastic into the interstitial spaces between the particles and to the surface of the parting agent so that the lubricating particles become intimately embedded in an integral matrix of the plastic material in the surface of the plastic article resulting from curing of the plastic material in the mold.

2. In a method of preparing a mold for molding of a plastic article from a liquid plastic normally characterized in its cured and set state as having a high coefficient of surface friction, degreasing the surface of a mold, heating the mold to a temperature from about 180° F. to about 212° F., applying a silicone parting agent to the mold surface, wiping excess parting agent from the mold surface, while the mold surface is still heated spraying finely divided tungsten lubricating particles predominantly in a multi-micron size to pass through a 50 micron mesh screen in a volatile fluid carrier and building up a coating of particles on the superficial surface of the parting agent, and by said heat rapidly evaporating the volatile carrier from the particles sufficiently completely to effect superficial adherence of the particles to one another and to the parting agent and thereby providing a substantially uniform porous matrix which substantially resists displacement by liquid plastic moving thereagainst and thereover and into the matrix on charging of the mold.

whereby the liquid plastic will penetrate the lubricating particle matrix to the parting agent surface and upon setting of the plastic the lubricating particles become integrally bonded in a matrix of the plastic in the surface portion of the resulting plastic article.

3. In a method of molding a solidifiable plastic material from a fluid condition, spraying onto at least certain molding parting agent treated surface area of a mold a substantially uniform coating of finely divided particles of solid material predominantly in a multi-micron size to pass through a 50 micron mesh screen in a volatile carrier, rapidly evaporating the carrier, and effecting superficial adherence of the particles to said surface area and to one another and thereby forming a porous matrix of the particles interstitially opening through the matrix to the surface area and with sufficient adherence of the particles to each other and the surface area to resist displacement relative to one another and to said surface area when fluid plastic material is moldingly run thereagainst and thereover, loading the mold with the liquid plastic material and running the plastic material onto and over the matrix and into the matrix to penetrate to the surface area, setting the plastic material into solid state wherein the porous matrix of particles is intimately interlocked in an integral matrix of the set plastic material at the surface of the article, and stripping the article and interlocked particles from the molding surface area.

References Cited in the file of this patent
UNITED STATES PATENTS

| | | |
|---|---|---|
| 2,246,463 | Garratt | June 17, 1941 |
| 2,320,921 | Ford | June 1, 1943 |
| 2,454,910 | Carr | Nov. 30, 1948 |
| 2,642,390 | Garofano | June 16, 1953 |
| 2,666,719 | Lissant | Jan. 19, 1954 |
| 2,715,617 | White | Aug. 16, 1955 |
| 2,719,093 | Voris | Sept. 27, 1955 |
| 2,887,345 | Johnson | May 19, 1959 |
| 2,926,427 | Hostetler | Mar. 1, 1960 |
| 2,941,849 | Sale | June 21, 1960 |
| 2,992,137 | Bunge et al. | July 11, 1961 |
| 3,021,573 | Bentov | Feb. 20, 1962 |